United States Patent [19]

Tamura et al.

[11] Patent Number: 4,555,213
[45] Date of Patent: Nov. 26, 1985

[54] DAYLIGHT FILM LOADING METHOD AND APPARATUS

[75] Inventors: Kaoru Tamura; Sadami Yamada, both of Kanagawa, Japan

[73] Assignee: Fuji Photo Film Co., Ltd., Kanagawa, Japan

[21] Appl. No.: 569,623

[22] Filed: Jan. 10, 1984

[30] Foreign Application Priority Data

Jan. 10, 1983 [JP] Japan ................................. 58-1953

[51] Int. Cl.⁴ .......................... G11B 1/00; G03B 41/16
[52] U.S. Cl. ........................................ 414/412; 271/1; 271/18; 354/276; 378/173; 414/403; 414/417; 414/786
[58] Field of Search ................... 271/1, 18, 169, 232; 354/276; 378/173; 414/403, 404, 405, 411, 412, 43, 786

[56] References Cited

U.S. PATENT DOCUMENTS 3,790,160  2/1974  Schmidt ............................... 271/18
3,912,932 10/1975  Matsumoto et al. ........... 378/173 X
3,934,150  1/1976  Matsumoto et al. .............. 414/412
4,201,919  5/1980  Schmidt ............................ 271/18 X Primary Examiner—Robert J. Spar
Assistant Examiner—Stuart J. Millman
Attorney, Agent, or Firm—Sughrue, Mion, Zinn, Macpeak & Seas

[57] ABSTRACT

A film package containing a stack of notched films in a light-tight envelope is held vertically in a light-tight loading chamber by a clamp member engaging with the notches of the films. The lower end of the envelope is cut, and the envelope is moved vertically relative to the films until the films are projected from the lower end of the envelope while the films are clamped by the clamp member. The clamp member is then disengaged from the notches of the films, and the films are allowed to move down into a receiving chamber positioned under the loading chamber. Then, a shutter is closed between the receiving chamber and the loading chamber to shield the films in the receiving chamber from light.

9 Claims, 15 Drawing Figures

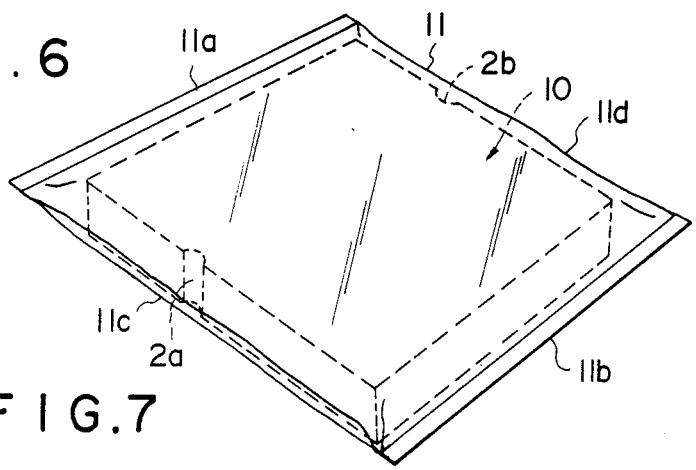
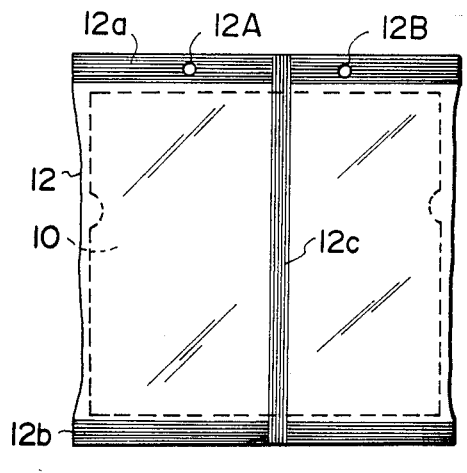
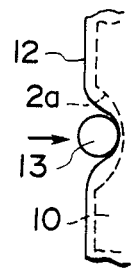
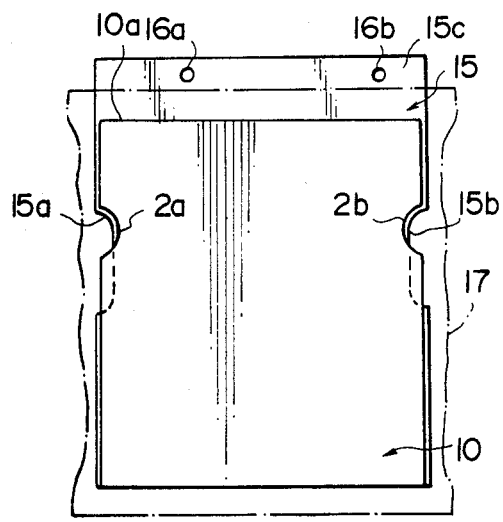
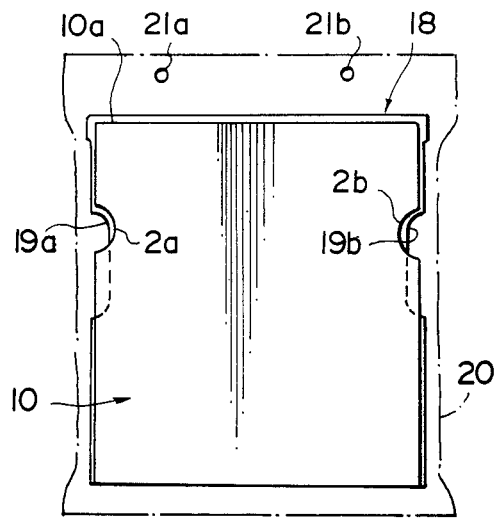

DAYLIGHT FILM LOADING METHOD AND APPARATUS

BACKGROUND OF THE INVENTION

1. Field of the Invention

This invention relates to a method of loading sheet-like light-sensitive films such as image recording photographic films or X-ray photographic films into an image recording apparatus, an X-ray image recording apparatus, or the like in a daylight environment, and an apparatus for carrying out the method.

2. Description of the Prior Art

There have heretofore been known various methods of and apparatuses for loading X-ray films or the like into a cassette in a daylight environment. In the conventional techniques, after a film package comprising a light-tight envelope, together with the films contained therein, is loaded into a light-tight chamber, the light-tight envelope is separated from the films or the films are drawn out of the light-tight envelope. However, these techniques have drawbacks in that the construction of the loading apparatus becomes complicated, that there is a risk of the films being damaged, and that only special packages can be handled.

For example, in method of and apparatus for loading X-ray films disclosed in U.S. Pat. No. 4,201,919, in order to conduct film loading in a daylight environment, a light-tight envelope of a film package is cut open in a condition shielded from light, and films are allowed to fall from the light-tight envelope. In this technique, however, the films do not fall together with one another but fall separately from one another and, therefore, they are readily damaged. Further, Japanese Unexamined Utility Model Publication No. 54(1979)-43328 discloses a cassette magazine constructed so that a light-tight envelope can be drawn out of a film package in a cassette to make it possible to handle films in a daylight environment. In the film package used in this technique, the light-tight envelope includes a U-shaped element having a length shorter than the length of the films, and is provided with a closed end portion and an open end portion. The open end portion of the light-tight envelope is opened by winding up the closed end portion. Thus the magazine has a comparatively simple construction. However, this technique is disadvantageous in that film packages other than the special ones cannot be used.

SUMMARY OF THE INVENTION

The primary object of the present invention is to provide a method of securely taking films from a light-tight envelope and feeding the films to the next process in a daylight environment in a simple manner without damaging the films.

Another object of the present invention is to provide an apparatus for carrying out the method.

The daylight film loading method in accordance with the present invention comprises:
(i) forming a clamp notch in a predetermined position of a side edge of an unexposed light-sensitive film,
(ii) forming a film package containing a stack of such notched films in a flexible light-tight envelope,
(iii) holding said film package in a vertical position in a loading chamber shielded from light, and holding the stack of said films by a clamp member in engagement with said clamp notch,
(iv) opening a lower end of said light-tight envelope and then moving said films and said light-tight envelope relative to each other in the vertical direction until at least the lower ends of said films are projected from a lower end of said light-tight envelope while said films are held by said clamp member,
(v) disengaging said clamp member from said clamp notch to release the clamping of said films, and
(vi) feeding said films to the next process.

In one aspect of the present invention, after the aforesaid step (iv), said clamp member is disengaged from said clamp notch to release the clamping of said films, thereby allowing said films to move down into a receiving chamber positioned under said loading chamber, a shutter is closed between said receiving chamber and said loading chamber to shield said films in said receiving chamber from light, and then said films are fed to the next process. After the shutter is closed to shield the films from light, it becomes possible to open the loading chamber above the shutter and remove the empty light-tight envelope. A new film package can then be loaded into the loading chamber. In the chamber below the shutter, the films can be sent one by one or in the form of the stack from the film receiving case to an image recording section.

In the present invention, at least one notch is formed at a predetermined position on at least one side edge of each film, and a stack of such films are held from outside the flexible light-tight envelope by engaging the clamp member with the notch. After the lower end of the light-tight envelope is cut, the light-tight envelope is maintained in the held condition, and the films and the light-tight envelope are moved relative to each other until the lower ends of the films are projected from the lower end of the light-tight envelope. Thereafter, the clamping of the films is released. Thus the light-tight envelope is in the condition opened sufficiently to allow the stack of films to pass therethrough when the clamping of the films is released. Therefore, all films of the stack separate from the light-tight envelope without fail. That is, a problem occurs because the outer films of the film stack are caught by the lower end of the light-tight envelope which is not opened sufficiently, and do not separate from the light-tight envelope.

Also, since the movement of the films and/or the light-tight envelope for projecting the lower ends of the films from the lower end of the light-tight envelope is conducted while the films are held by a clamp member, there is no risk of the film stack falling into disorder during the movement of the films and the light-tight envelope relative to each other. Accordingly, the films can be securely fed to the next process.

The daylight film loading apparatus in accordance with the present invention comprises:
(i) a first light-type housing (i.e. a loading chamber) provided with an openable cover,
(ii) a second light-tight housing (i.e. a receiving chamber) provided with a film exit and positioned under said first light-tight housing,
(iii) a shutter openably mounted between said first light-tight housing and said second light-tight housing,
(iv) a clamp member for holding a stack of notched films contained in a light-tight envelope by engagement with the notch or notches of said films from outside the light-tight envelope in said first light-tight housing.
(v) a means for holdiing said light-tight envelope in said first light-tight housing, (vi) a means for opening a lower end of said light-tight envelope, (vii) a means for moving said films and said light-tight envelope, the lower end of which has been opened, relative to each other in the vertical direction until at least the lower ends of said films are projected from the lower end of said light-tight envelope, and (viii) a means for disengaging said clamp member from said notch or notches of said films.

The movement of the films and the light-tight envelope relative to each other may be carried out either by pulling the films down by moving the clamp member down, or by pulling the light-tight envelope up while the clamp member is maintained stationary (in either case, the light-tight envelope must be made of a flexible material since it should be slid between the notch or notches of the films and the clamp member). Alternaively, the aforesaid movement may be conducted by pulling the films down by the clamp member and, at the same time, pulling the light-tight envelope up. In the case where the light-tight envelope is pulled up while the clamp member is maintained stationary, it is advantageous to position a stop member for contacting with the upper ends of the films from outside the light-tight envelope. This is because this makes it possible to restrict the upward movement of the films (particularly the outer films of the film stack) caused by frictional engagement of the films with the light-tight envelope not only by the clamp member but also by the stop member. Accordingly, the force exerted on the notch or notches of the films by the contact thereof with the clamp member is decreased, and the notch or notches of the films are prevented from breaking. Also, after the clamping of the films by the aforesaid clamp member is released, it is possible to receive the films by a film receiving case positioned near the lower ends of the films at the film clamping releasing position. Then, the films at least the lower ends of which are projected from the lower end of the light-tight envelope can be taken out one by one and fed to the next process.

After the clamping of the films by the aforesaid clamp member is released, the films may be allowed to move by the weight thereof into the receiving chamber positioned under the loading chamber. However, in this method, there is a risk of the films separating from one another, particularly when the distance between the film loading chamber and the receiving chamber is long (i.e. when the difference in height therebetween is large). Accordingly, in one aspect of the present invention, a film receiving case is used in the second light-tight housing for reciprocation between a film receiving position near the lower ends of the films in the clamping releasing position where the clamp member is disengaged from the notch or notches of the films and a film storing position.

In the aforesaid aspect of the present invention, before the clamping of the films is released, the film receiving case is moved up to the film receiving position. Thereafter, the clamping of the films is released to allow the films to fall into the film receiving case. The film receiving case is then moved down to store the films in the receiving chamber. In this case, the films do not separate from one another when they are moved from the loading chamber to the receiving chamber.

In order to protect the films included in the form of the stack in the light-tight envelope, a protective sheet should preferably be laid on at least one surface of the film stack. The protective sheet should preferably be separate from the light-tight envelope and provided with a notch or notches at least partially matching the notch or notches of the films, so that the protective sheet and the films can be held by the clamp member and projected from the light-tight envelope together with each other. In this case, even when the films are projected from the light-tight envelope, the outer film of the film stack does not rub against the inner surface of the light-tight envelope and moved by frictional engagement therewith. Therefore, the notch or notches of the films do not receive large force from the clamp member, but instead are protected from mechanical damage.

In the case where the protective sheet is included together with the films in the film package, after the lower ends of the films and the lower end of the protective sheet are projected from the lower end of the light-tight envelope, the clamping of the films may be released while the protective sheet is still clamped. However, in order to securely separate the films from the protective sheet, the protective sheet and the films should preferably be moved relative to each other in the vertical direction until the lower ends of the films are projected from the lower end of the protective sheet.

Accordingly, the present invention also provides a daylight film loading apparatus comprising a film receiving case as described above, which further comprises a film projecting means for moving the films and the protective sheet projected from the lower end of the light-tight envelope relative to each other in the vertical direction and projecting the lower ends of the films from the lower end of the protective sheet, and a means for holding the protective sheet after at least the lower ends of the films are projected from the lower end of the protective sheet.

By "holding the film package in a vertical position" is meant such a manner of holding that, when holding is released, the film package will move by its weight in the direction along the surface of the film package. Namely, the term "vertical position" embraces not only the position at right angles to the horizontal position but also inclined positions.

The mechanism for holding the films should preferably be constructed in such a manner that clamp notches are formed in approximately symmetrical positions on opposite side edges of the films, and a pair of clamp members (claws, bars, or the like) are engaged with the notches from outside the light-tight envelope containing the films, thereby to hold the films suspended therefrom. The clamp notches may be formed, for example, one at each side edge of the film in approximately symmetrical positions. Alternatively, one notch may be formed at one side edge of the film, and two notches may be formed at the other side edge of the film one above and the other below the point symmetrical to the aforesaid notch formed at said one side edge. Or, one or more notches may be formed only at one side edge of the film, and the other side edge provided with no notch may be pressed against a flat contact face for holding the film.

BRIEF DESCRIPTION OF THE DRAWINGS

FIG. 6 is a perspective view showing an embodiment of the film package comprising a light-tight envelope and a stack of the films as shown in FIG. 5, FIG. 7 is a plan view showing another embodiment of the film package, FIG. 7A is an enlarged view showing a part of the film package shown in FIG. 7 together with a clamp member, FIGS. 8, 9 and 10 are plan views showing further embodiments of the film package.

DESCRIPTION OF THE PREFERRED EMBODIMENTS

The present invention will hereinbelow be described in further detail with reference to the accompanying drawings.

Figure 1:
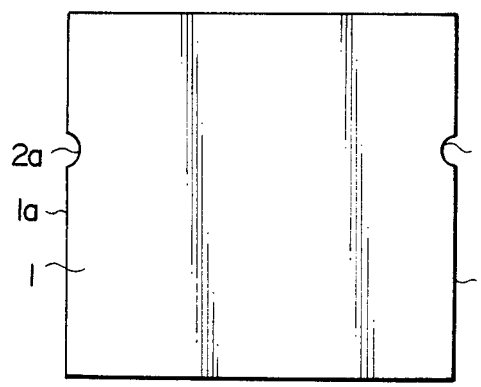
FIGS. 1 to 4 are plan views showing various embodiments of the film used in the daylight film loading method in accordance with the present invention.
Figure 2:
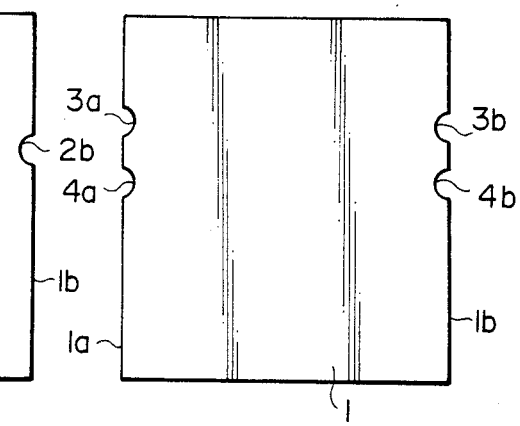
Figure 3:
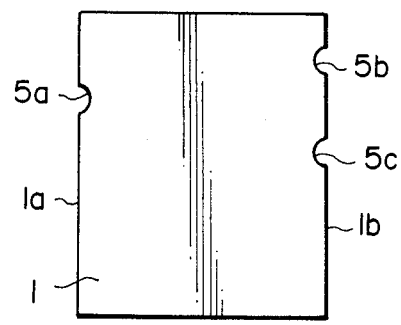
Figure 4:
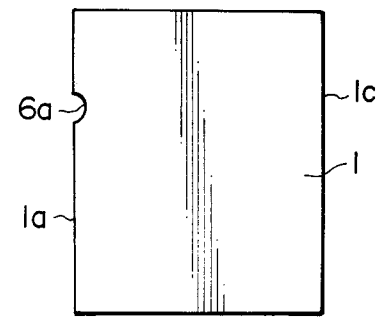

FIGS. 1 to 4 show various embodiments of the film used in an embodiment of the daylight film loading apparatus in accordance with the present invention. A film 1 is an unexposed rectangular light-sensitive film, and at least one clamp notch is formed at a side edge or side edges of the film 1. In FIG. 1, a notch 2a is formed at a side edge 1a, and a notch 2b is formed at the other side edge 1b. In FIG. 2, notches 3a and 4a are formed at the side edge 1a, and notches 3b and 4b are formed at the other side edge 1b. In FIG. 3, a notch 5a is formed at the side edge 1a, and notches 5b and 5c are formed at the other side edge 1b in such a manner that the middle point between notches 5b and 5c is symmetric with respect to the notch 5a. In FIG. 4, a notch 5a is formed at the side edge 1a, and no notch is formed at the other side 1c. The notches 2a, 2b, 3a, 4a, 3b, 4b, 5a, 5b, 5c and 6a have a size and a shape suitable for securely hanging the film 1 when the notches are engaged with clamp members such as claws or bars. When the notch 6a is formed only at one side edge 1a of the film 1 as shown in FIG. 4, the other side edge 1c having no notch is pushed against a flat contact face (or a contact plate is pushed against the side edge 1c), and only the notch 5a is engaged with a clamp member to hang the film 1. By "hanging" is meant not only the case where the film 1 is hung exactly vertically but also the case where the film 1 is placed, for example, on an inclined surface and supported thereon through the engagement of the notch or notches of the film 1 with a clamp member or clamp members such as pins.

An embodiment of the daylight film loading method and apparatus in accordance with the present invention, wherein the films as shown in FIG. 1 are used, will now be described below.

Figure 5:
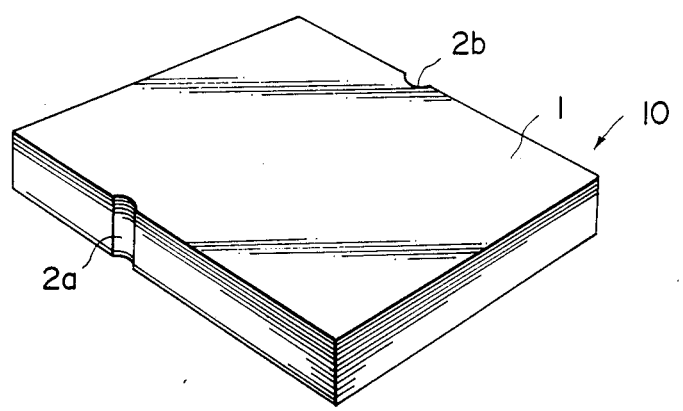
FIG. 5 is a perspective view showing an embodiment of a stack of the films used in the daylight film loading method in accordance with the present invention.

The films 1 as shown in FIG. 1 are laid one upon another by aligning the notch positions as shown in FIG. 5 to form a film stack 10. The film stack 10 is then inserted into a flexible light-tight envelope 11 as shown in FIG. 6. The light-tight envelope 11 may be made of polyethylene, polypropyrene, polyvinyl chloride-polyvinyl acetate, or the like, containing a light-absorbing pigment or an opacifier such as carbon black. Alternatively, the light-tight envelope 11 may be made of opaque multi-ply paper, for example, two-ply paper wherein one ply is opaque. The light-tight envelope 11 is made by heat sealing both end edges 11a and 11b of a cylindrical polyethylene film. The side portions 11c and 11d of the light-tight envelope 11 are soft so that, when the side portions 11c and 11d are held by clamp bar members from the outside thereof, the clamp bar members can sufficiently fit into and engage with the notches 2a and 2b at the side edges of the film stack 10.

In the film package shown in FIG. 7, it is possible to hang the film stack 10 as described above by sandwiching the film stack 10 from outside the light-tight envelope 11 by use of the clamp bar members. When the lower end edge of the light-tight envelope 11 is cut while the light-tight envelope 11 is held in the aforesaid condition by an appropriate means, and then the clamp bar members are simultaneously disengaged from the notches 2a and 2b of the film stack 10, the film stack 10 falls from the light-tight envelope 11 into a receiving case positioned below the film package. This step is conducted in a condition shielded from light, and then a light-shielding shutter is closed on the receiving case to complete film loading in a daylight environment.

In the film package as described above, in order to facilitate holding of the light-tight envelope 11 while allowing the film stack 10 to fall from the light-tight envelope 11, it is advantageous to form clamp holes at a part, for example, a heat seal portion, of the light-tight envelope 11. FIG. 7 shows such a embodiment of the film package. In the embodiment of FIG. 7, the film stack 10 is contained in a light-tight envelope 12 provided with clamp holes 12A and 12B at a heat seal portion 12a at one end edge. The light-tight envelope 12 is made by heat sealing the upper end edge portion 12a, a lower end edge portion 12b and a middle portion 12c of a light-tight film made of polyethylene or the like. In this embodiment, since the light-tight envelope 12 is provided with the clamp holes 12A and 12B, it is possible to hold the light-tight envelope 12 by engaging the clamp holes 12A and 12B with pins or the like of the loading apparatus when making the film stack 10 fall out from the light-tight envelope 12. Therefore, the film stack 10 can be easily separated from the envelope 12 without fail.

FIG. 7A shows the condition of clamping the film package shown in FIG. 7 by use of a clamp bar member 13. The bar member 13 is engaged with the notch 2a of the film stack 10 contained in the light-tight envelope 12. Since the light-tight envelope 12 is sufficiently flexible, it is deformed along the notch 2a by the bar member 13, and the bar member 13 can securely hold the film stack 10.

When the films 1 of the film package are not so rigid, a protective sheet may be included in the film package together with the film stack 10 to protect the films 1 from mechanical damage.

Figure 10:
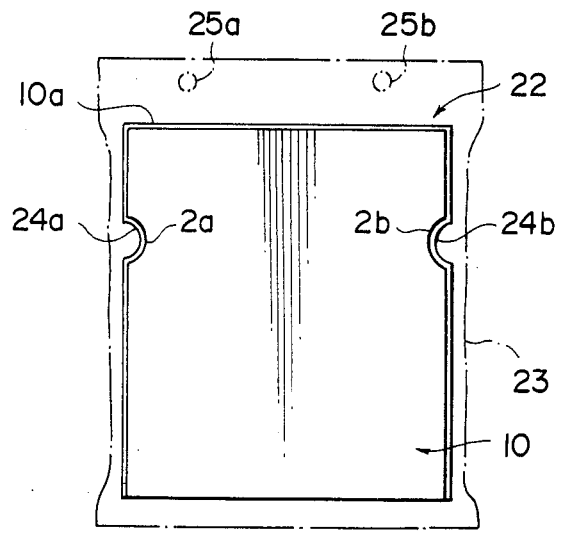

FIGS. 8, 9 and 10 show various embodiments of the film package used in accordance with the present invention, wherein a protective sheet is contained together with the films.

In FIG. 8, a protective sheet 15 has the same width as the width of the film stack 10 and has notches 15a and 15b elongated downwardly as compared with the notches 2a and 2b of the film stack 10. Also, the protective sheet 15 is longer than the film stack 10 and is provided with clamp holes 16a and 16b at a portion 15c projected upwardly from the upper end of the film stack 10. The projected portion 15c extends beyond the upper end of a light-tight envelope 17 and is secured to the light-tight envelope 17 in the vicinity of the projected portion 15c.

In FIG. 9, a protective sheet 18 has the same width as the width of the film stack 10 approximately over the entire length of the protective sheet 18. However, the upper end portion of the protective sheet 18 is slightly wider than the film stack 10. As in the embodiment of FIG. 8, notches 19a and 19b of the protective sheet 18 are formed in such a manner that the upper portions of the notches 19a and 19b respectively match the notches 2a and 2b of the film stack 10 and the lower portions thereof are elongated downwardly as compared with the notches 2a and 2b of the film stack 10. The protective sheet 18 is not secured to a light-tight envelope 20 as in the embodiment of FIG. 8, and the light-tight envelope 20 has clamp holes 21a and 21b at the upper end portion.

In FIG. 10, a protective sheet 22 has the same width as the width of the film stack 10, and is separate from a light-tight envelope 23 as in the embodiment of FIG. 9. Notches 24a and 24b of the protective sheet 22 have approximately the same size as the size of the notches 2a and 2b of the film stack 10 and are positioned so as to completely match the notches 2a and 2b, respectively. The light-tight envelope 23 is provided at the upper portion with clamp holes 25a and 25b.

The protective sheet 15, 18 or 22 as described above is laid on one surface or both surfaces of the film stack 10. Alternatively, a pair of the protective sheets sandwiching the film stack 10 from the front side and the rear side of the film stack 10 may be joined at the upper ends to form a U-shaped cross-section which also covers the upper end face 10a of the film stack 10.

Figure 11:
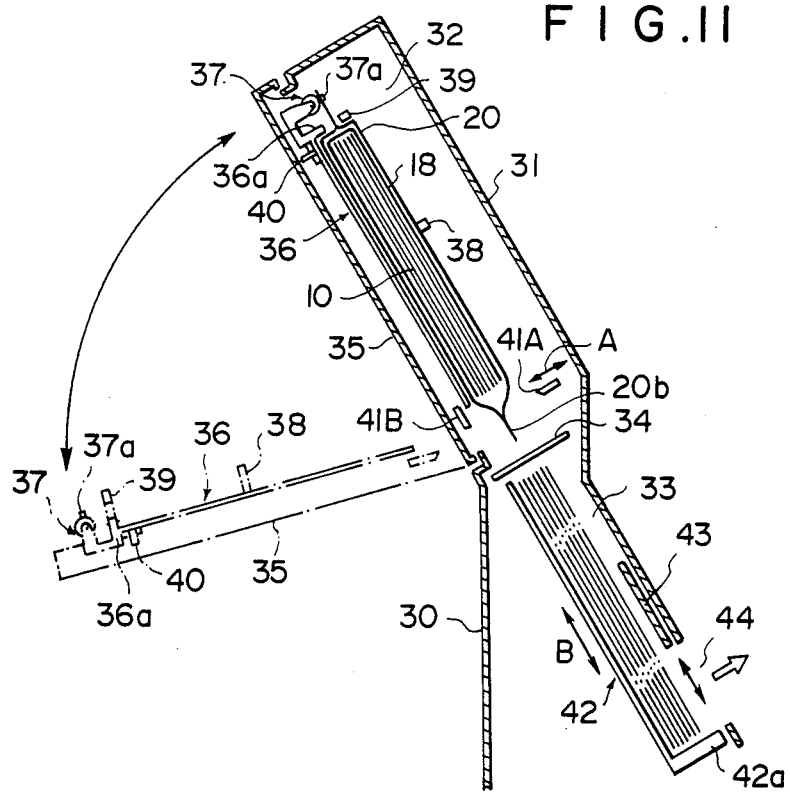
FIG. 11 is a sectional side view showing an embodiment of the daylight film loading apparatus in accordance with the present invention, wherein the film package of FIG. 9 is used.

FIG. 11 shows an embodiment of the daylight film loading apparatus in accordance with the present invention, wherein the film package of FIG. 9 including the protective sheet 18 which is more preferable than the protective sheets 15 and 22 is used. In this embodiment, the protective sheet 18 is modified to have a U-shaped cross-section as described above.

In FIG. 11, a cover 31 of a light-sensitive film loading section is positioned at a part of a housing 30 on the side of an apparatus, for example, an X-ray image recording apparatus when the light-sensitive film is an X-ray film, or an image recording apparatus (for example, an apparatus using a scanning laser beam) when the light-sensitive film is a light-sensitive recording film for image recording. The housing 30 is divided by a shutter 34 into a film package loading chamber 32 at the upper section and a film receiving chamber 33 at the lower section. The film package loading chamber 32 is provided with an openable light-shielding cover 35, and a film package supporting base 36 is positioned on the inner surface of the light-shielding cover 35. At a portion of the supporting base 36 which is positioned on the upper side when the light-shielding cover 35 is closed, there is rotatably supported a clamp and wind-up shaft 37 provided with a pair of clamp pins 37a. On the right and left sides of the middle portion of the supporting base 36 are provided a pair of clamp bars 38 capable of symmetrically moving in the inward-outward direction and in the vertical direction. The pair of clamp pins 37a are used for engagement with the pair of clamp holes 21a and 21b, and the pair of clamp bars 38 are used for engagement with the notches 2a and 2b at the right and left side edges of the film stack 10 from outside the light-tight envelope 20.

A stop member 36a projecting from the upper surface of the film package supporting base 36 and extending approximately over the entire width of the supporting base 36 is secured to the supporting base 36 in a position closer to the middle portion thereof than the clamp and wind-up shaft 37. Above the stop member 36a is positioned a stop bar 39 which is supported on one side of the supporting base 36 for rocking between a film stack stop position closer to the stop member 36a and a release position far spaced apart from the stop member 36a. On the supporting base 36 are also supported a pair of protective sheet holding claws 40 for movement between a protective sheet holding position above a side edge portion of the supporting base 36 in the vicinity of the stop member 36a and a release position opened outwardly in the lateral direction of the supporting base 36.

At the lower section of the film package loading chamber 32 are positioned an upper blade 41A and a lower blade 41B of a cutter for cutting the lower end edge 20b of the light-tight envelope 20. The upper blade 41A is movable in the direction of the arrow A. The lower blade 41B is stationary and secured to the inner surface of the light-shielding cover 35.

Figure 13:
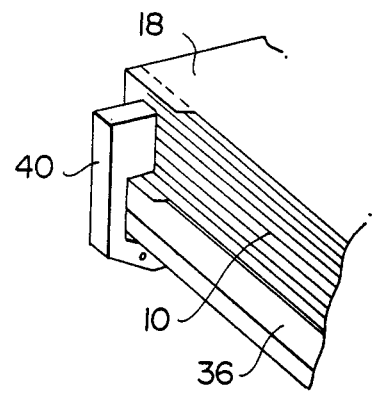
FIG. 13 is an enlarged perspective view showing a part of the apparatus of FIG. 11.

The shutter 34 is openably mounted between the upper chamber 32 and the lower chamber 33, and can be moved at an angle normal to the drawing sheet in FIG. 13. A tray 42 vertically slidable in the direction of the arrow B is positioned in the film receiving chamber 33, and a film exit 44 provided with an openable window 43 is positioned on the forward side of the lower section of the tray 42. The tray 42 can be moved upwardly into the film package loading chamber 32 until a bottom plate 42a of the tray 42 is positioned just below the film stack 10 in the film package loading chamber 32. Therefore, the film stack 10 can fall onto the tray 42 without receiving any shock.

Operations of the apparatus shown in FIG. 11 for daylight loading will now be described below.

First, the light-shielding cover 35 of the film package loading chamber 32 is opened, and then the stop bar 39 is moved to the release position. A film package is placed on the film package supporting base 36 positioned on the inner surface of the light-shielding cover 35. At this time, the clamp holes 21a and 21b of the light-tight envelope 20 are engaged with the pair of clamp pins 37a of the clamp and wind-up shaft 37. Thereafter, the stop bar 39 is moved to the film stack stop position standing face to face with the stop member 36a, and fixed by a fixing means (not shown) such as a latching means. As a result, the stop bar 39 and the stop member 36a are positioned in face-to-face relation to the upper end face of the protective sheet 18 from outside the light-tight envelope 20. Further, the clamp bars 38 positioned on opposite sides of the film package are moved inwardly for engagement with the notches 19a and 19b of the protective sheet 18 and the notches 2a and 2b of the film stack 10 from outside the light-tight envelope 20. At this time, the protective sheet holding claw 40 is in the release position away from the light-tight envelope 20. Then, the light-shielding cover 35 is closed and locked. In this manner, the film package is positioned in the film package loading chamber 32 in the condition shielded from light as shown in FIG. 11.

Figure 12:
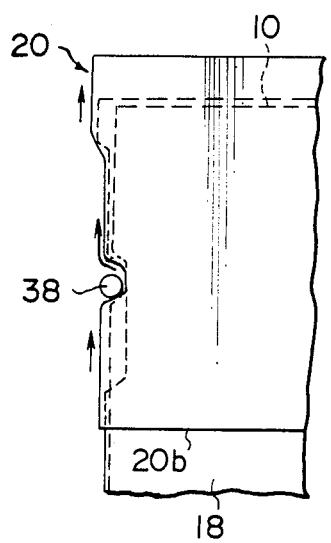
FIG. 12 is a plan view showing a part of the apparatus of FIG. 11.

Thereafter, the upper blade 41A of the cutter is moved in the direction of the arrow A to cut the lower end edge 20b of the light-tight envelope 20 in cooperation with the lower blade 41B. At this time, since the film stack 10 is held in a position higher than the cutter by engagement of the notches 2a and 2b with the clamp bars 38, there is no risk of the films being cut by the cutter. Then, the clamp and wind-up shaft 37 is rotated by a drive unit (not shown) in the counterclockwise direction, as viewed from above the plane of the drawing sheet in FIG. 11. As a result, the light-tight envelope 20 the lower end edge 20b of which has been cut is wound up by the clamp and wind-up shaft 37. That is, as shown in FIG. 12, the light-tight envelope 20 is slid upwardly between the clamp bars 38 and a combination of the protective sheet 18 with the film stack 10 clamped by the clamp bars 38. In this manner, the lower ends of the protective sheet 18 and the film stack 10 are projected from the lower end edge 20b of the light-tight envelope 20. When the light-tight envelope 20 is wound up as described above, the film stack 10 is urged to move up together with the light-tight envelope 20 by frictional engagement therewith. However, since the notches 2a and 2b of the film stack 10 are clamped by the clamp bars 38, the film stack 10 is maintained in the predetermined clamp position.

Also, since the upper end face of the protective sheet 18 comes into contact with the stop bar 39 and the stop member 36a from outside the light-tight envelope 20, the film stack 10 urged upwardly as described above is stopped by the stop bar 39 and the stop member 36a. Accordingly, no large force is exerted on the notches 2a and 2b, and the peripheral portions of these notches 2a and 2b are not broken.

Figure 14:
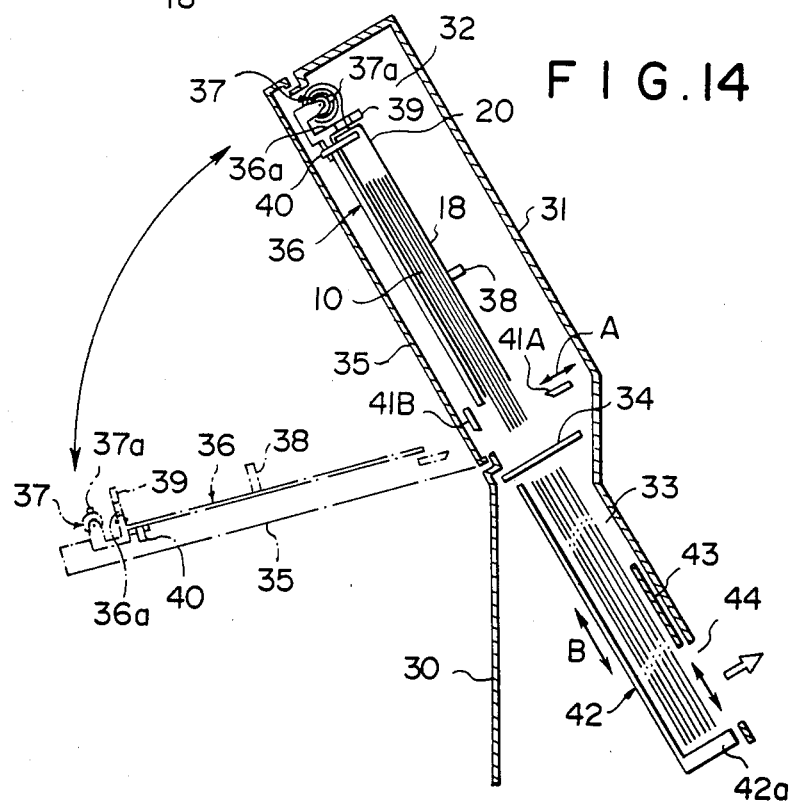
FIG. 14 is a sectional side view showing a different operating condition of the apparatus of FIG. 11.

The clamp and wind-up shaft 37 is rotated until the light-tight envelope 20 is completely separated from the film stack 10 and the protective sheet 18. Then, the pair of protective sheet holding claws 40 are moved to the protective sheet holding positions on both sides of the film stack 10. As shown in FIG. 13, reach protective sheet holding claw 40 protrudes inside the U-shaped upper end portion of the protective sheet 18, where the width of the protective sheet 18 is larger than the width of the film stack 10. Thereafter, the clamp bars 38 are moved down by a predetermined distance. As a result, the film stack 10 the notches 2a and 2b of which are engaged with the clamp bars 38 are moved down by the aforesaid predetermined distance along the film package supporting base 36. On the other hand, since the inside of the upper end portion of the protective sheet 18 comes into contact with the protective sheet holding claws 40, the protective sheet 18 is prevented from moving down. Accordingly, the film stack 10 is moved down relative to the protective sheet 18, and the lower end of the film stack 10 is projected downwardly from the lower end of the protective sheet 18 as shown in FIG. 14. The downward movement of the film stack 10 relative to the protective sheet 18 can be effected as described above since the notches 19a and 19b of the protective sheet 18 are elongated downwardly as compared with the notches 2a and 2b of the film stack 10. After the lower end of the film stack 10 is projected from the lower end of the protective sheet 18, the shutter 34 is opened, and the empty tray 42 is moved upwardly until the bottom plate 42a of the tray 42 goes to the vicinity of the lower ends of the films. The clamp bars 38 are moved away from the film stack 10 to release the film stack 10. At this time, since the light-tight envelope 20 has been wound up and completely separated from the film stack 10 and the protective sheet and also the lower end of the film stack 10 has been projected from the lower end of the protective sheet 18, the outer films of the film stack 10 are not caught by the light-tight envelope 20 and/or the protective sheet 18. Therefore, the whole film stack 10 is moved by the weight thereof securely into the tray 42 at one time. Thereafter, as the tray 42 is moved down, the film stack 10 is separated downwardly from the protective sheet 18 and, ultimately, completely shifted to the tray 42. The tray 42 is moved down to the predetermined film storing position as shown in FIG. 11 and stopped in that position.

Then, the shutter 34 is closed, thus completing the film loading in a daylight environment. The light-shielding cover 35 is opened, and the empty light-tight envelope 20 and the protective sheets 18 are taken out of the film package loading chamber 32. The openable window 43 of the film receiving chamber 33 is then opened, and the film sheets are fed one by one through the film exit 44 by a sheet feeding device using, for example, a sucker, and used for image recording.

When or before the film receiving chamber 33 runs out of film sheets, another film package is loaded into the film package loading chamber 32. By repeating the operations mentioned above, it is possible to always have a film package standing by and to efficiently load the films.

In the above-described embodiment, in order to securely take out the film stack 10, the light-tight envelope 20 is wound up until it is completely separated from the film stack 10 and the protective sheet 18, and then the lower end of the film stack 10 is projected from the lower end of the protective sheet 18. However, the light-tight envelope 20 need not necessarily be completely separated from the film stack 10 and the protective sheet 18, nor is the lower end of the film stack 10 projected from the lower end of the protective sheet 18.

Also, instead of using the movable tray 42 it is possible to allow the film stack 10 to fall by the weight thereof into the film receiving chamber 33 when the clamp bars 38 are released from the notches 2a and 2b of the film stack 10. In this case, however, there arises a risk of the films falling separately from one another. Also, in the embodiment described above, the protective sheet holding claws 40 are used to hold the protective sheet 18 when the lower end of the film stack 10 is projected from the lower end of the protective sheet 18. However, the protective sheet holding claws 40 may be replaced by a means for tightly contacting the side face of the protective sheet 18, a means for attracting by a vacuum, or the like. In the case where the step of projecting the lower end of the film stack 10 from the lower end of the protective sheet is not conducted, i.e. when the movement of the film stack 10 relative to the protective sheet is not carried out, it is possible to use the protective sheet 22 as shown in FIG. 10. Also, in the case where the protective sheet and the light-tight envelope are together separated from the film stack 10, it is possible to employ the protective sheet 15 as shown in FIG. 8. Though the protective sheet need not be included in the film package, it is advantageous to use the protective sheet in order to improve the film protecting effect. Further, the rotation type wind-up shaft 37 used for pulling up the light-tight envelope 20 may be replaced by a means for sliding and pulling up the light-tight envelope 20, or the like. Also, the relative movement of the light-tight envelope 20 to the film stack 10 for projecting the lower end of the film stack 10 from the lower end of the light-tight envelope 20 may also be carried out by use of a means for moving the film stack 10 down, instead of pulling up the light-tight envelope 20.

Further, in the present invention, instead of completely winding up the light-tight envelope 20, at least the lower end of the film stack 10 may be projected from the light-tight envelope 20 and the protective sheet. In this case, the clamp bar 38 is then released, and the film stack 10 is received by a film receiving case positioned near the lower end of the film stack 10 at the film clamping releasing position. Thus, while at least the lower end of the film stack 10 is projected from the light-tight envelope 20 and the protective sheet, the films are taken out one by one and fed to the next process. In this embodiment, the construction of the apparatus becomes simpler.

We claim:

1. A daylight film loading method comprising:
   (i) forming a clamp notch in a predetermined position of a side edge of an unexposed light-sensitive film,
   (ii) forming a film package containing a stack of such notched films in a flexible light-tight envelope,
   (iii) holding said film package in a vertical position in a loading chamber shielded from light, and holding the stack of said films by a clamp member in engagement with said clamp notch,
   (iv) opening a lower end of said light-tight envelope and then moving said films and said light-tight envelope relative to each other in the vertical direction until at least the lower ends of said films are projected from a lower end of said light-tight envelope while said films are held by said clamp member,
   (v) disengaging said clamp member from said clamp notch to release the clamping of said films, and
   (vi) feeding said films to the next process.

2. A daylight film loading method comprising:
   (i) forming a clamp notch in a predetermined position of a side edge of an unexposed light-sensitive film,
   (ii) forming a film package containing a stack of such notched films in a flexible light-tight envelope,
   (iii) holding said film package in a vertical position in a loading chamber shielded from light, and holding the stack of said films by a clamp member in engagement with said clamp notch,
   (iv) opening a lower end of said light-tight envelope and then moving said films and said light-tight envelope relative to each other in the vertical direction until at least the lower ends of said films are projected from a lower end of said light-tight envelope while said films are held by said clamp member,
   (v) disengaging said clamp member from said clamp notch to release the clamping of said films, thereby allowing said films to move down into a receiving chamber positioned under said loading chamber,
   (vi) closing a shutter between said receiving chamber and said loading chamber to shield said films in said receiving chamber from light, and
   (vii) feeding said films to the next process.

3. A method as defined in claim 1 wherein a film receiving case is moved upwardly to the vicinity of the lower ends of said films in the clamping release position before the clamping of said films by said clamp member is released, said films are then allowed to move into said film receiving case by releasing the clamping of said films, and then said film receiving case is moved down to send said films into said receiving chamber.

4. A method as defined in claim 2 or 3 wherein two or more of said clamp notches are formed at approximately symmetrical positions on both side edges of said films, clamp members are positioned at the film side edges so as to sandwich said films from both side edges and, when said clamp members are released, at least one of said clamp members is disengaged from the clamp notches of said films.

5. A method as defined in claims 2 or 3 wherein said film package contains a protective sheet for protecting said films by covering at least one surface of the stack of said films, said protective sheet having a clamp notch at least at the portion overlapping said clamp notch of said films when laid on said films, and the movement of said films and said light-tight envelope is carried out by moving said light-tight envelope and a combination of said films with said protective sheet relative to each other and then moving said films and said protective sheet relative to each other.

6. A daylight film loading apparatus comprising:
   (i) a first light-tight housing provided with an openable cover,
   (ii) a second light-tight housing provided with a film exit and positioned under said first light-tight housing,
   (iii) a shutter openably mounted between said first light-tight housing and said second light-tight housing,
   (iv) a clamp member for holding a stack of notched films contained in a light-tight envelope by engagement with the notch or notches of said films from outside the light-tight envelope in said first light-tight housing,
   (v) a means for holding said light-tight envelope in said first light-tight housing,
   (vi) a means for opening a lower end of said light-tight envelope,
   (vii) a means for moving said films and said light-tight envelope, the lower end of which has been opened, relative to each other in the vertical direction until at least the lower ends of said films are projected from the lower end of said light-tight envelope, and
   (viii) a means for disengaging said clamp member from said notch or notches of said films.

7. A daylight film loading apparatus comprising:
   (i) a first light-tight housing provided with an openable cover,
   (ii) a second light-tight housing provided with a film exit and positioned under said first light-tight housing,
   (iii) a shutter openably mounted between said first light-tight housing and said second light-tight housing,
   (iv) a clamp member for holding a stack of notched films contained in a light-tight envelope by engagement with the notch or notches of said films from outside the light-tight envelope in said first light-tight housing,
   (v) a means for holding said light-tight envelope in said first light-tight housing,
   (vi) a means for opening a lower end of said light-tight envelope,
   (vii) a means for moving said films and said light-tight envelope, the lower end of which has been opened, relative to each other in the vertical direction until at least the lower ends of said films are projected from the lower end of said light-tight envelope, (viii) a means for disengaging said clamp member from said notch or notches of said films, and (ix) a film receiving case for reciprocation between a film receiving position near the lower ends of said films in the clamping release position where said clamp member is disengaged from the notch or notches of said films and a film storing position in said second light-tight housing.

8. A daylight film loading apparatus comprising:

(i) a first light-tight housing provided with an openable cover, (ii) a second light-tight housing provided with a film exit and positioned under said first light-tight housing, (iii) a shutter openably mounted between said first light-tight housing and said second light-tight housing, (iv) a clamp member for holding a stack of notched films and a protective sheet laid on at least one surface of said film stack, said films and said protective sheet being contained in a light-tight envelope, by engagement with the notch or notches of said films and with a notch of said protective sheet at least partially matching the notch or notches of said films from outside the light-tight envelope in said first light-tight housing, (v) a means for holding said light-tight envelope in said first light-tight housing, (vi) a means for opening a lower end of said light-tight envelope, (vii) a means for moving the combination of said films with said protective sheet and said light-tight envelope, the lower end of which has been opened, relative to each other in the vertical direction until at least the lower end of said combination of said films with said protective sheet is projected from the lower end of said light-tight envelope, (viii) a film projecting means for moving said films and said protective sheet projected from the lower end of said light-tight envelope relative to each other in the vertical direction and projecting the lower ends of said films from the lower end of the protective sheet, (ix) a means for holding said protective sheet after at least the lower ends of said films are projected from the lower end of said protective sheet, (x) a means for disengaging said clamp member from said notch or notches of said films, and (xi) a film receiving case for reciprocation between a film receiving position near the lower ends of said films in the clamping release position where said clamp member is disengaged from the notch or notches of said films and a film storing position in said second light-tight housing.

9. A method as defined in claim 4, wherein said film package contains a protective sheet for protecting said films by covering at least one surface of the stack of said films, said protective sheet having a clamp notch at least at the portion overlapping said clamp notch of said films when laid on said films, and the movement of said films and said light-tight envelope is carried out by moving said light-tight envelope and a combination of said films with said protective sheet relative to each other and then moving said films and said protective sheet relative to each other.

* * * * *